(12) United States Patent
Durand et al.

(10) Patent No.: US 12,444,488 B2
(45) Date of Patent: Oct. 14, 2025

(54) METHOD AND APPARATUS FOR DISPLAYING PROGRESS INFORMATION

(71) Applicant: Fresenius Vial SAS, Brézins (FR)

(72) Inventors: Christine Durand, Chassieu (FR); Clément Vallois, Vinay (FR)

(73) Assignee: Fresenius Vial SAS, Brézins (FR)

( * ) Notice: Subject to any disclaimer, the term of this patent is extended or adjusted under 35 U.S.C. 154(b) by 719 days.

(21) Appl. No.: 17/759,512

(22) PCT Filed: Feb. 19, 2021

(86) PCT No.: PCT/EP2021/054100
§ 371 (c)(1),
(2) Date: Jul. 26, 2022

(87) PCT Pub. No.: WO2021/165442
PCT Pub. Date: Aug. 26, 2021

(65) Prior Publication Data
US 2023/0084283 A1 Mar. 16, 2023

(30) Foreign Application Priority Data

Feb. 20, 2020 (EP) ..................................... 20290019

(51) Int. Cl.
*G16H 20/17* (2018.01)
*H04N 21/431* (2011.01)

(52) U.S. Cl.
CPC ......... *G16H 20/17* (2018.01); *H04N 21/4312* (2013.01)

(58) Field of Classification Search
None
See application file for complete search history.

(56) References Cited

U.S. PATENT DOCUMENTS

| | | |
|---|---|---|
| 2011/0071844 A1 | 3/2011 | Cannon et al. |
| 2016/0103960 A1 | 4/2016 | Hume et al. |
| 2017/0140126 A1 | 5/2017 | Portnoy et al. |

FOREIGN PATENT DOCUMENTS

EP 0985421 3/2000

OTHER PUBLICATIONS

International Search Report and Written Opinion, counterpart International App. No. PCT/EP2021/054100 (May 7, 2021) (11 pages).

*Primary Examiner* — Manuel A Mendez
(74) *Attorney, Agent, or Firm* — Cook Alex Ltd.

(57) ABSTRACT

A method for displaying progress information on dispensing at least one fluid with at least one medical pump device (110), comprising: receiving, at a processing device (152), data associated with a total amount of the fluid to be dispensed; receiving, at the processing device (152), consecutively status information pertaining at least to an amount of the fluid already dispensed; displaying, on a display device (154), a progress bar (1), comprising: a first section (3) having a first size corresponding to an amount of the fluid yet to be dispensed, and a second section (5) having a second size corresponding to the amount of the fluid already dispensed; and determining based on the received status information whether fluid is being dispensed, and highlighting at least a part of the progress bar (1) based on determining that fluid is being dispensed. The invention also relates to computer-readable storage medium and to an apparatus for displaying progress information.

17 Claims, 6 Drawing Sheets

METHOD AND APPARATUS FOR DISPLAYING PROGRESS INFORMATION

The present application is a U.S. National Stage of PCT International Patent Application No. PCT/EP2021/054100, filed Feb. 19, 2021, which claims priority to EP Application Serial No. 20290019.7, filed Feb. 20, 2020, both of which are hereby incorporated herein by reference.

The invention relates to a method for displaying progress information on dispensing at least one fluid with at least one medical pump device. The invention also relates to a computer-readable storage medium, and to an apparatus for displaying progress information.

Infusion devices such as syringe pumps or volumetric pumps are medical pump devices which are well-known and widely used in a wide variety of medical applications. Infusion devices come in multiple operating principles for pumping various fluids such as medication or nutrients into a patient's circulatory system. Examples for other known medical pump devices, i.e. besides infusion devices, are feeding pumps, which can be used for nasogastric tube feeding.

Medical pump devices are usually controlled by a computing or processing device and can administer fluids in ways that would be impractically expensive or unreliable if performed manually by a medical practitioner or medical staff member. For example, by means of a medical pump device, small amounts (considered in volume or dose) of a fluid can be steadily dispensed with a controlled infusion speed over a long period of time.

In a medical or healthcare setting, such as in an operating room or an intensive care unit of a hospital, a container, such as an infusion bag, a syringe, etc. holding a fluid to be dispensed into the patient's circulatory system through an infusion tube can be loaded into the medical pump device for dispensing the fluid in a controlled and automated manner. In general, one medical pump device is used for dispensing one kind of fluid, e.g. a medicine. Often it becomes necessary to administer large amounts of one specific fluid, or different fluids, e.g. different medicines, into one patient's circulatory system at the same time or at different times with different infusion speeds. For this reason, a plurality of medical pump devices is often employed in parallel for use on a single patient and which are typically located in the same spot, for example all medical pump devices can be conveniently located on a rack for holding the medical pump devices. The operation of the medical pump devices can be monitored with the use of an apparatus having a display device, which can be also referred to as Therapy Manager, etc., for presenting status information pertaining to the medical pump devices to the user. For example, an infusion device is described in EP0985421A2.

Status information, e.g. relating to the amount of the fluid already dispensed and yet to be dispensed, is often presented to the user by displaying numerical values in the display. Therefore, the presentation of status information is often rather complex to apprehend for the user, who is required to put in relation all the different displayed figures for making an informed decision in regard to the further treatment of the patient. Also, a single console controlling a plurality of connected medical pump devices can produce a multiplicity of figures that may render information processing more difficult for the user, which may result in the user making wrong decisions, since in the medical field decisions must be often made in a very short time based solely on information presented to the user.

As an example, US2017140126 relates to an integrated medication and infusion monitoring system with images presenting drug related text data in columns adjacent to corresponding graphical representations of infusion pump status.

Therefore, there is a need for improved techniques for displaying progress information.

The invention provides a method for displaying progress information on dispensing at least one fluid with at least one medical pump device, comprising:
  receiving, at a processing device, data associated with a total amount of the fluid to be dispensed;
  receiving, at the processing device, consecutively status information pertaining at least to an amount of the fluid already dispensed;
  displaying, on a display device, a progress bar, comprising:
    a first section having a first size corresponding to an amount of the fluid yet to be dispensed, and
    a second section having a second size corresponding to the amount of the fluid already dispensed; and
  determining based on the received status information whether fluid is being dispensed, and highlighting at least a part of the progress bar based on determining that fluid is being dispensed.

The fluid can be a medicine or a nutrition fluid that can be delivered to a human or animal body. The term "medical pump device" can be used herein to refer to an infusion device or any other pump device capable of delivering fluids to the human or animal body. The method can, for example, be executed in an apparatus for displaying progress information comprising the processing device and the display device.

The data associated with a total amount of the fluid to be dispensed can be manually entered by the user, or automatically detected, for example at the medical pump device. The data can comprise a specific amount of the fluid to be dispensed, and optionally also a time-span during which the fluid is to be dispensed. In examples, the data may comprise further optional information, e.g., whether the fluid is dispensed gradually, or whether a certain time function, e.g. ramp function, is used.

The data associated with the total amount of the fluid can be received once at the beginning of dispensing the fluid, or the data can be received multiple times while the fluid is being dispensed, for example, whenever a parameter is changed. The before mentioned parameter can be, for example, changed manually by the user or automatically by the medical pump device.

Also, at the processing device, status information pertaining at least to the amount of the fluid already dispensed is received consecutively. Here, the term "consecutively" can mean that status information or sets of status information can be received one after another at time instances that are different from each other. In particular, the status information can be received "periodically" which can be understood as following a certain time interval, e.g. once a second or more often. Also, "periodically" can be used to refer to a reception taking place in quasi real-time or real-time. The status information can, for example, comprise the amount of the fluid already dispensed and also the amount of the fluid yet to be dispensed. However, the amount of the fluid yet to be dispensed can be also calculated at the processing device from the total amount of the fluid to be dispensed and the amount of the fluid already dispensed.

Further, the status information can also comprise data indicative of the remaining time-span for dispensing the fluid, and/or other information that could be useful for the user.

The progress bar comprises a first section having a first size corresponding to an amount of the fluid yet to be dispensed, and a second section having a second size corresponding to the amount of the fluid already dispensed. The term "size" can be used herein to refer to a width or a height of a section. For example, if the progress bar is horizontally arranged on the display device, then the term "size" can be used to refer to a width of the sections. However, if the progress bar is vertically arranged on the display device, then the term "size" can be used to refer to a height of the sections.

Here, the first section and the second section can have sizes proportional to the values they represent, wherein the sizes can be adjusted based on the consecutively received status information following the reception of a new set of status information. Alternatively, the sizes can be adjusted only when a certain value in sets of previously received status information exceeds a threshold, triggering an update of the progress bar.

The method also comprising the step of determining based on the received status information whether fluid is being dispensed, and highlighting at least a part of the progress bar based on determining that fluid is being dispensed.

The determining can be also done at the processing device. For example, the determining can be done by comparing two subsequently received values of the amount of the fluid already dispensed in the status information with each other. If the values differ from each other, it can be determined that fluid is being dispensed. Alternatively, an absolute value of the difference of subsequently received values could be compared to a threshold. It can then be determined that fluid is being dispensed, if the absolute value exceeds this threshold. Advantageously, inaccuracies in the measurement can be overcome by using the latter approach.

Highlighting at least a part of the progress bar based on determining that fluid is being dispensed is a transient graphical or data visualization on the display device to the user that the dispensing of the fluid is still ongoing. According to the invention the highlighting is provided by a different optical appearance, preferably by a dynamic optical appearance, of at least part of the progress bar. Therefore, highlighting at least a part of the progress bar could be described for instance also as a pulsing of at least a part of the progress bar.

The dynamic optical appearance is a time-dependent or transient visual effect, which is added, preferably superimposed, to the progress bar. This visual effect quickly informs the user of an on-going infusion. This is in particular useful when the movement of the progress bar is essentially imperceptible by the user, for instance for a low flow rate. In this case the dynamic optical appearance is then preferably of a higher dynamic than the one of the progress bar.

In one embodiment the different dynamic optical appearance is provided by at least one element of the group consisting of re-coloring, flashing, putting a frame at least partially around the progress bar and changed luminosity.

The highlighting at least a part of the progress bar can be, for example, done by superimposing at least a part of the progress bar with a wave effect as described in more detail below.

Alternatively, or in addition to superimposing at least part a part of the progress bar with a wave effect, the highlighting could be also done by re-coloring the first or second section. Here, the term "re-coloring" can be used to refer to a change of color from the color originally used to either a different shade of said color or to a different color, for example to a bright color, like bright yellow or orange for attracting a user's attention.

However, the highlighting could be also done by employing a flash effect to at least part of the progress bar. Here, at least part of the first or second section could be illuminated on the display using a rhythmic light effect, where the total duration of the light in each period is shorter than the total duration of the darkness and in which the flashes of light are all of equal or different duration.

In yet another example, at least part of the first or second section could be highlighted by putting a frame around the first or second section. For example, the frame could have a greater line width than the original line width and could also have a different color than the color used for the first or second section.

Advantageously, the method allows the user to more easily obtain progress information on dispensing at least one fluid with at least one medical pump device. The method provides a more practical, reliable, and faster way to inform the user.

By employing the herein described method, the display of the progress bar can credibly assist the user to take immediate action based on the information conveyed in the progress bar.

In an example, highlighting at least a part of the progress bar comprises highlighting the first section and/or the second section.

In examples, the progress bar can be horizontally orientated, vertically orientated, or can have any other orientation.

In an example, highlighting at least a part of the progress bar based on determining that fluid is being dispensed comprises:

superimposing at least a part of the progress bar with a dynamic wave effect extending at least partly from a perimeter of the progress bar by generating at least one sub-section having a different shade or color, in particular a brighter shade or color than the first section and/or second section, and propagating the sub-section through the progress bar at least partly.

In examples, a propagating direction of the sub-section can be a horizontal propagation direction or a vertical propagation direction depending on the specific application of the method.

Here, the term "superimposing" can be also used exchangeably with the term "overlaying".

The different color can be, for example, a white color and the sub-section can have the shape of a bar, wherein the bar can be propagated periodically starting from one perimeter, e.g. from one side, top, or bottom of the progress bar, at least partly through the progress bar.

Advantageously, by adding "movement" to the display, a stop in dispensing the fluid, can be even better recognized by the user. Also, the propagating direction of the sub-section can correspond to the dispensing direction of the medical pump.

In the above mentioned example highlighting can only comprise highlighting the first section. In further examples, also the second section can be highlighted, or both sections can be highlighted completely or partly at the same time or at different times.

In an example, the method comprises the step of adjusting a propagation speed of the sub-section based on the amount of the fluid being dispensed.

Advantageously, by dispensing more fluid in a time period, the propagation speed can be faster compared to a slower propagation speed when less fluid is dispensed in the same time period.

In an example, highlighting at least a part of the progress bar comprises:
superimposing the first section at least partly with the dynamic wave effect extending at least partly from one of the
left or right perimeter of the first section, or
top or bottom perimeter of the first section
by generating the sub-section of the first section having a different color, in particular a brighter color, than the first section, and propagating, in particular horizontally or vertically propagating, the sub-section at least partly through the first section with a predetermined propagation speed.

Advantageously, even if the first section has been decreased to a size or below the size of the sub-section by superimposing the first section, it is well perceptible whether or not fluid is being dispensed.

In an example, propagating the sub-section comprises:
adding a fading gradient to the sub-section, preferably orientated in the opposite direction of a propagation direction.

In an example, displaying the progress bar comprises:
projecting a beam originating from a sub-section of the highlighted part of the progress bar into a non-highlighted part of the progress bar.

The term "projecting a beam" can be used herein to refer to a "burst" extending into the non-highlighted part of the progress bar, either permanently, reoccurring at certain time instances, or just for a brief moment before fading out. Projecting the beam can depend on whether fluid is being dispensed and/or on the dispensing speed of the fluid.

In an example, where the first section is superimposed at least partly with the dynamic wave effect, "projecting a beam" can comprise projecting the beam from the sub-section at least partly into the second section at the start of propagating the sub-section at least partly through the first section. Here, a first "burst" of the dynamic wave effect can extend into the opposite direction than the propagation direction. The beam can be projected into the second section only briefly before starting to propagate the sub-section. For example, the visual appearance of projecting the beam can be similar to the light-beam of a lighthouse that might cause the visual effect of the beam being turned around at 180°.

Advantageously, the display of ongoing infusion visual information to the user can be further enhanced, in particular when the residual volume or dose to be delivered is small by projecting the beam as described above.

In another example, when a small residual volume or dose is to be delivered, the dynamic wave effect can also propagate all through the first and the second section, for example from the right to the left over the entire span of the progress bar. The on-going infusion can then be easily visualized even when the first section is small compared to the second section.

In an example, the method comprises:
displaying, in a horizontal direction, the first section and the second section consecutively, and/or
displaying the first section with the first size decreasing by an equal amount as the second size of the second section is increasing, while the amount of the fluid already been dispensed is increasing, and/or
displaying the progress bar spanning across at least 85% of a usable display width or height of the display device, preferably the progress bar spanning across the whole usable display width or height of the display device, and/or
displaying, at the first section a first textual indication pertaining to the amount of the fluid yet to be dispensed, and/or
displaying, at the second section a second textual indication pertaining to the amount of the fluid already dispensed, and/or
displaying the first section in a different shade, preferably in a lighter shade of the same color, than the second section, preferably wherein the different shade of the first section comprises a color gradient.

Here, the combined sizes of the first section and the second section can remain constant, while the individual sizes of the first section and the second section can change according to the amount of the fluid already dispensed.

The term "usable display width" can be used herein to refer to an area of the display that can be used for displaying information, which can be an area delineated by the sides of the display.

Advantageously, the overall size of the progress bar is not changing while fluid is dispensed and can, for example, span from one side to another side of the display device, or of a display or screen associated with the display device, regardless of the amount of fluid already dispensed.

Also, a linear function could be used such that advancing one section, while regressing the other section, can be directly proportional to the amounts of the fluid already dispensed and yet to be dispensed. Advantageously, acceleration, deceleration, and pauses in dispensing the fluid can be more efficiently presented.

The progress bar being composed of the first section and the second section can be arranged horizontally when viewed by the user on the display device.

Further, in addition to the progress bar, actual numbers can be displayed indicating the amount of the fluid yet to be dispensed and/or already dispensed.

Also, the first section can be displayed in a lighter shade of a color, while the second section is displayed in a darker shade of said color. As an example, and just for the sake of explanation, the first section can be displayed in light red, while the second section can displayed in dark red. The different shade of the first section can also comprise a color gradient, wherein the darker end of the gradient could be oriented towards the dispensing direction to make the transition between the first and the second section even more recognizable and to give more precise information.

Advantageously, the visibility of the progress bar and the manner of conveying information to the user can be further enhanced by displaying the first section in a different shade than the second section.

In an example, the first section is arranged on a perimeter, in particular on a first or second side, of the progress bar in accordance with a dispensing direction of the medical pump.

For example, in case of an injection device holding a syringe like container in which the fluid is stored, the dispensing direction can be a direction in which a corresponding plunger is pushed by the medical pump device, etc. The term "dispensing direction" can, thus, be used to refer to a direction of fluid flow out of the medical pump when the medical pump is arranged in an operating position, e.g. arranged in a rack holding the medical pump in the operating position. In most cases, the dispensing direction can be from the "right" to the "left". Hence, the first section can be arranged on the left hand side, while the second section can be arranged on the right-hand side.

In an example, the method comprising:
determining, based on the received status information, an alarm event, and highlighting the first section and/or the second section using a color scheme corresponding to the alarm event.

For example, the alarm event can be determined when the amount of the fluid being dispensed over a certain time interval exceeds or drops below a predefined threshold value. To convey the alarm event to the user, the first section and/or the second section can be highlighted by re-coloring the first section and/or the second section, or by overlaying the first section and/or the second section with a different color.

In an example, receiving, at the processing device, consecutively status information pertaining at least to an amount of the fluid already dispensed comprises
receiving status information in real-time, and/or
receiving textual data and displaying the textual data in the progress bar.

Advantageously, the status information can be made available to the user as soon as a corresponding event is occurring. Alternatively, depending on the application, the status information can be also received in slower intervals, for example once per second, to preserve computing resources.

Also, the name of a medicine can be displayed in the display along with the progress bar.

In an example, the method further comprising:
dispensing at least a further fluid with a further medical pump device, in particular dispensing a plurality of further fluids, each with at least one corresponding further medical pump device; and
displaying, at the display device, at least one further progress bar associated with the further fluid, in particular a plurality of further progress bars associated with the further fluids.

Advantageously, data from a plurality of medical pump devices can be presented on a single display device.

In an example thereof, the method further comprising:
displaying the first sections and/or the second sections of the progress bar and the further progress bar using a specific color and/or contour shape associated with the corresponding medical pump device.

Advantageously by using different colors and/or contour shapes the association between progress bar and medical pump device and/or fluid dispensed can be made easier.

The invention also relates to computer-readable storage medium comprising instructions which, when executed by a computer, cause the computer to carry out the steps of the before described method.

Further, the invention relates to an apparatus for displaying progress information on dispensing at least one fluid with at least one medical pump device, comprising:
a processing device, adapted to receive data associated with a total amount of the fluid to be dispensed, to receive consecutively status information pertaining at least to an amount of the fluid already dispensed, and to determine based on the received status information whether fluid is being dispensed; and
a display device, adapted to display a progress bar, comprising:
a first section having a first size corresponding to an amount of the fluid yet to be dispensed, and
a second section having a second size corresponding to the amount of the fluid already dispensed, and
wherein at least a part of the progress bar is highlighted based on determining that fluid is being dispensed.

The apparatus can be, for example, comprised in the medical pump device and/or in a device controlling one or a plurality of medical pump devices, e.g. a so called "therapy manager".

In an example, the medical pump device is a nutrition pump, or an infusion pump, in particular a syringe pump, a volumetric pump, or a patient-controlled analgesia, PCA, pump.

The idea underlying the invention shall subsequently be described in more detail with respect to the embodiments shown in the figures. Herein:

FIGS. 1A-1G show a progress bar 1 according to an embodiment of the invention.

The progress bar shown in FIGS. 1A-1G comprises a first section 3 having a first size corresponding to an amount of the fluid yet to be dispensed, and a second section 5 having a second size corresponding to the amount of the fluid already dispensed. In the shown embodiment the term "sizes" refers to the "widths" of the first section 3 and the second section 5.

In the shown embodiment, the sizes of the first section 3 and second section 5 are essentially equal, which may indicate that already half of the fluid to be dispensed was dispensed. Depending on the progress of dispensing the fluid, the first section 3 and the second section 5 can have different sizes.

In FIGS. 1A-1G, the progress bar is also shown as being orientated in a horizontal direction, and the first section 3 and the second section 5 are shown being arranged consecutively behind each other. As shown, the first section 3 is displayed in a different shade than the second section 5. Here, the first section 3 is displayed in a lighter shade of the same color than the second section 5.

It can be also seen from FIGS. 1A-1G that the first section 3 of the progress bar 1 comprises a color gradient extending from the right perimeter of the first section 3 into the direction of the left perimeter, wherein the color of the first section 3 is getting darker towards the left perimeter.

As it can be best seen in FIGS. 1B-1G, part of the first section 3 is highlighted indicating that fluid is being dispensed. Essentially, the FIGS. 1A-1G can be seen as showing one cycle of a "wave effect" propagating through the first section 3, while fluid is being dispensed.

Here, highlighting of the first section 3 is done by superimposing at least part of the first section 3 with the wave effect, which causes the impression of a dynamic wave extending at least partly through the first section 3, starting from the right perimeter of the first section 3.

Here, a sub-section 7 of the first section 3 being shown as a white bar is horizontally propagated at least partly through the first section 3. As shown, the sub-section 7 also comprises a fading gradient orientated in the opposite direction of a propagation direction going from right to left in the shown embodiment. Also, as it can be seen, the sub-section 7 is slowly fading while propagating further into the first section 3.

In the shown embodiment, a beam 6 is projected from the sub-section 7 at least partly into the second section 5 at the start of propagating the sub-section 7 through the first section 3. As it can be best seen in FIG. 1B, the dynamic wave effect extends briefly into the opposite direction of the propagation direction, i.e. into the second section 5, before disappearing again.

FIGS. 1A to 1G show one propagation cycle. Once the sub-section 7 is propagated into the first section 3 a new propagation cycle can start.

FIGS. 2A-2G show the progress bar 1 according to the embodiment of the invention already shown before in FIGS. 1A-1G. The description above relating to each one of FIGS. 1A-1G also applies to the corresponding figure from FIGS. 2A-2G. The only difference between FIGS. 1A-1G and FIGS. 2A-2G can be found in that in FIGS. 2A-2G hatching patterns are used to indicate colors and/or gradients. Here, the spacing between two vertical bars stands for the color/shading it symbolizes.

Figure 1A:
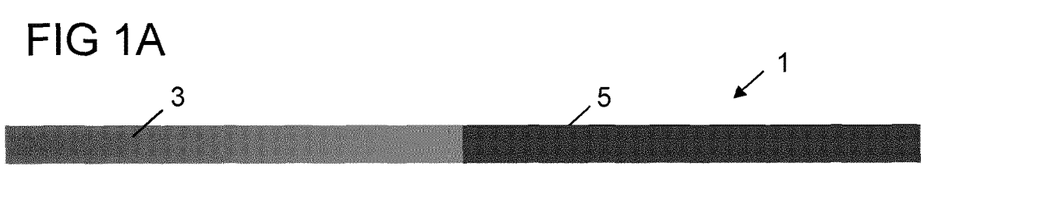
FIG. 1A-1G show a progress bar according to an embodiment of the invention.
Figure 1B:
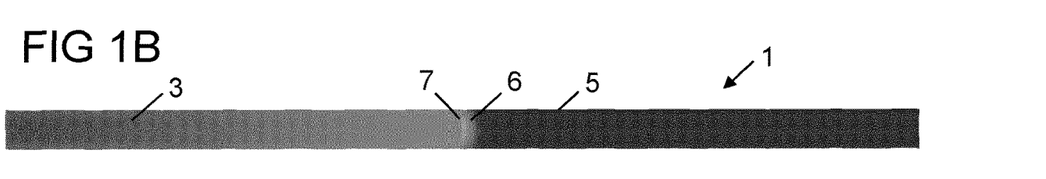
Figure 1C:
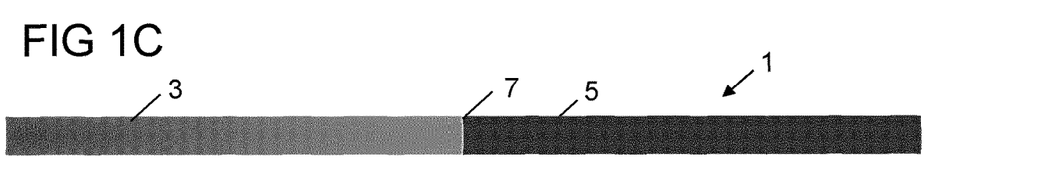
Figure 1D:
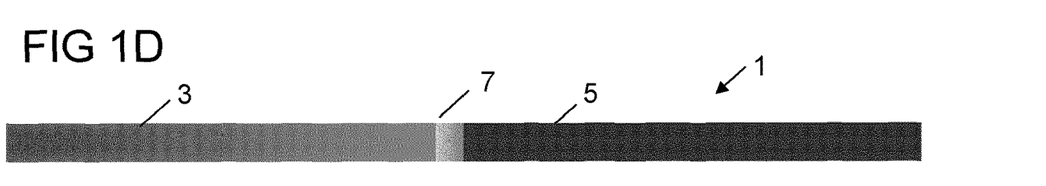
Figure 1E:
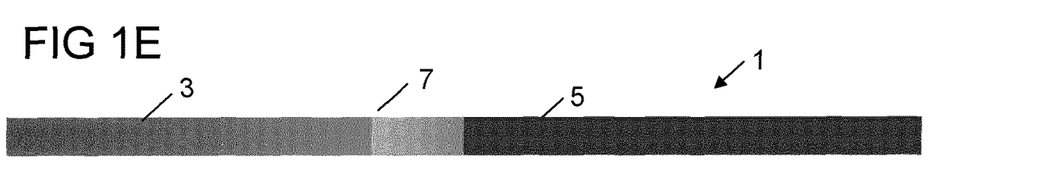
Figure 1F:
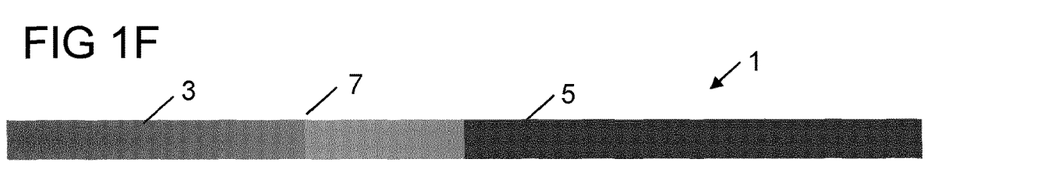
Figure 1G:
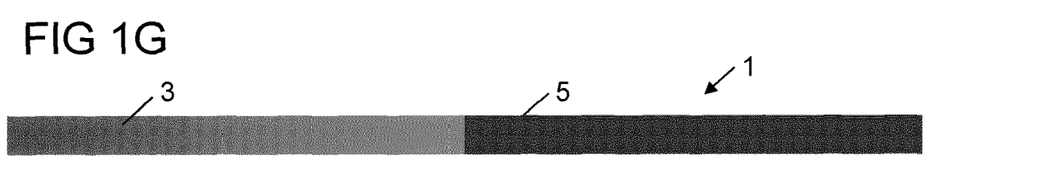
Figure 2A:
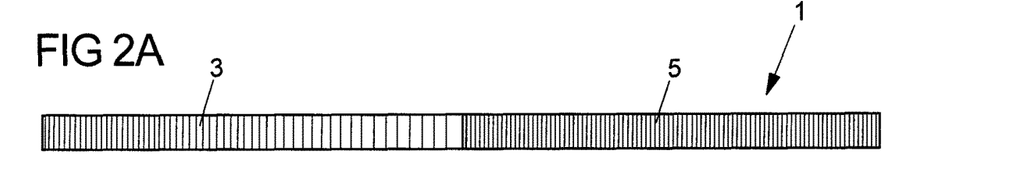
FIG. 2A-2G show the progress bar according to the embodiment of the invention shown in FIGS. 1A-1G.
Figure 2B:
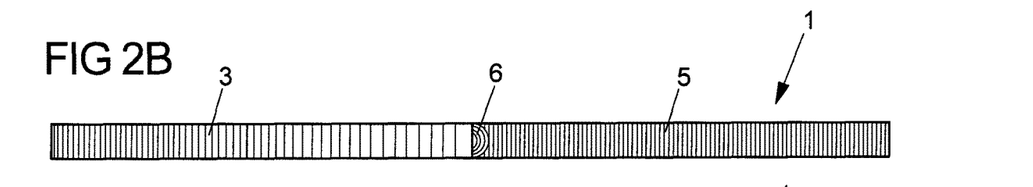
Figure 2C:
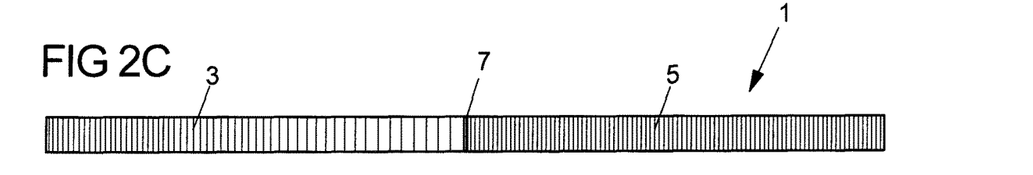
Figure 2D:
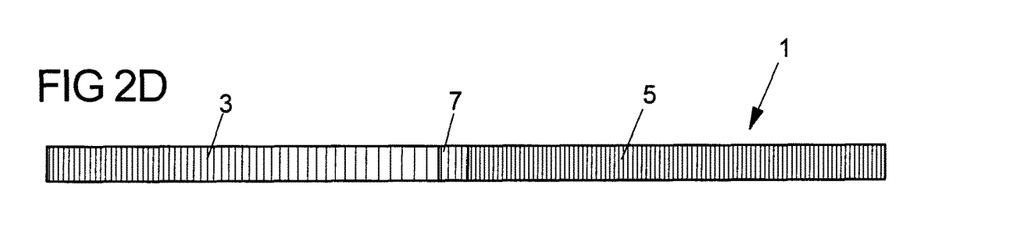
Figure 2E:
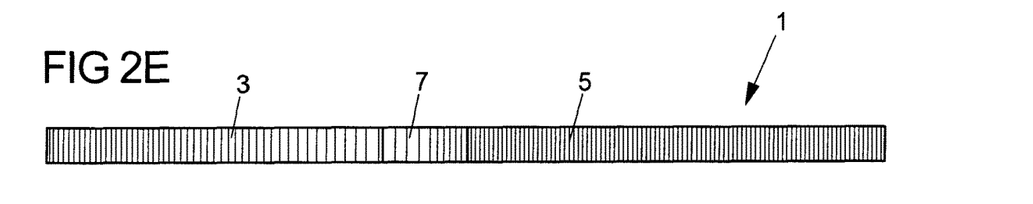
Figure 2F:
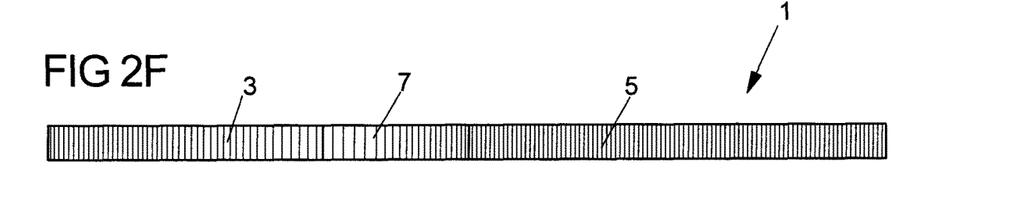
Figure 2G:
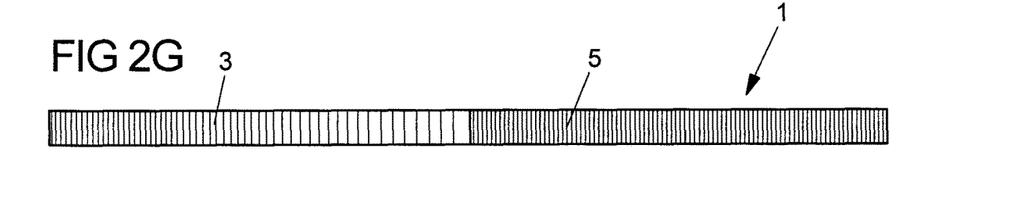
Figure 3A:
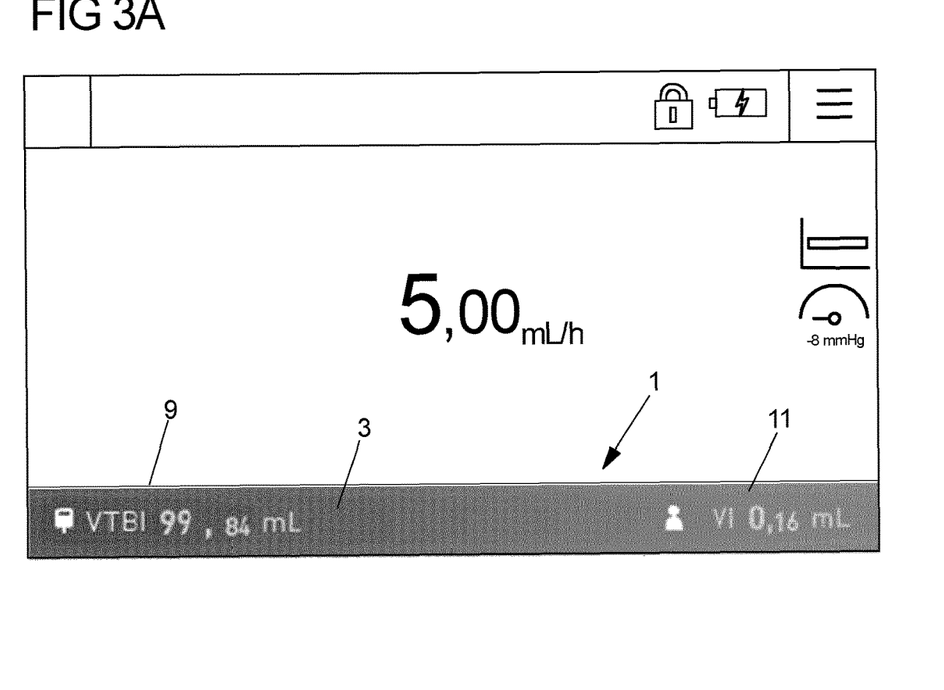
FIG. 3A, 3B show the display of a progress bar according to an embodiment of the invention.
Figure 3B:
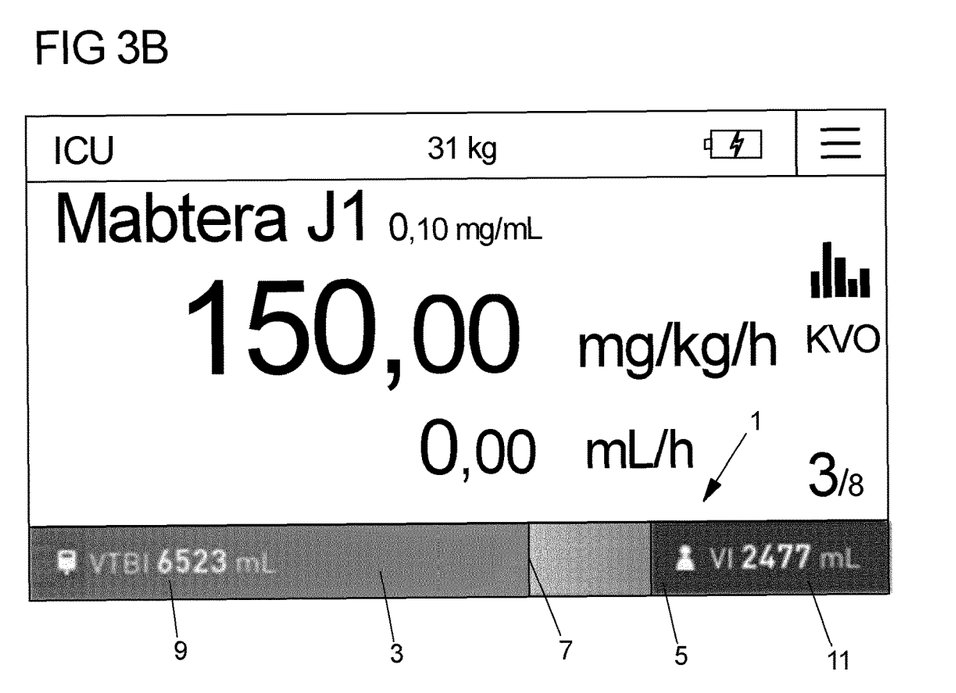

FIGS. 3A and 3B show the display of a progress bar 1 according to an embodiment of the invention. The shown figures are screen-shots of a display of a medical pump device showing, among other information, also the progress bar 1.

In FIG. 3A, the progress bar 1 is shown at the start of a dispensing process. Here, the size of the first section 3, which corresponds to an amount of the fluid yet to be dispensed, extends horizontally almost over the entire width of the display.

In FIGS. 3A and 3B, the progress bar 1 also comprises a first textual indication 9 pertaining to the amount of the fluid yet to be dispensed, and a second textual indication 11 pertaining to the amount of the fluid already dispensed.

In FIG. 3B, the progress bar 1 is shown during dispensing. Here, the size of the first section 3 has become smaller in comparison to the shown size of the first section 3 in FIG. 3A, while the size of the second section 5 has increased. Also, it can be seen that the overall size of the progress bar 1 remains constant.

The sub-section 7 comprising the fading gradient which is orientated towards the opposite direction of the propagation direction and going from right to left and indicating that fluid is being dispensed and that the dispensing direction is on the left hand side.

Figure 4:
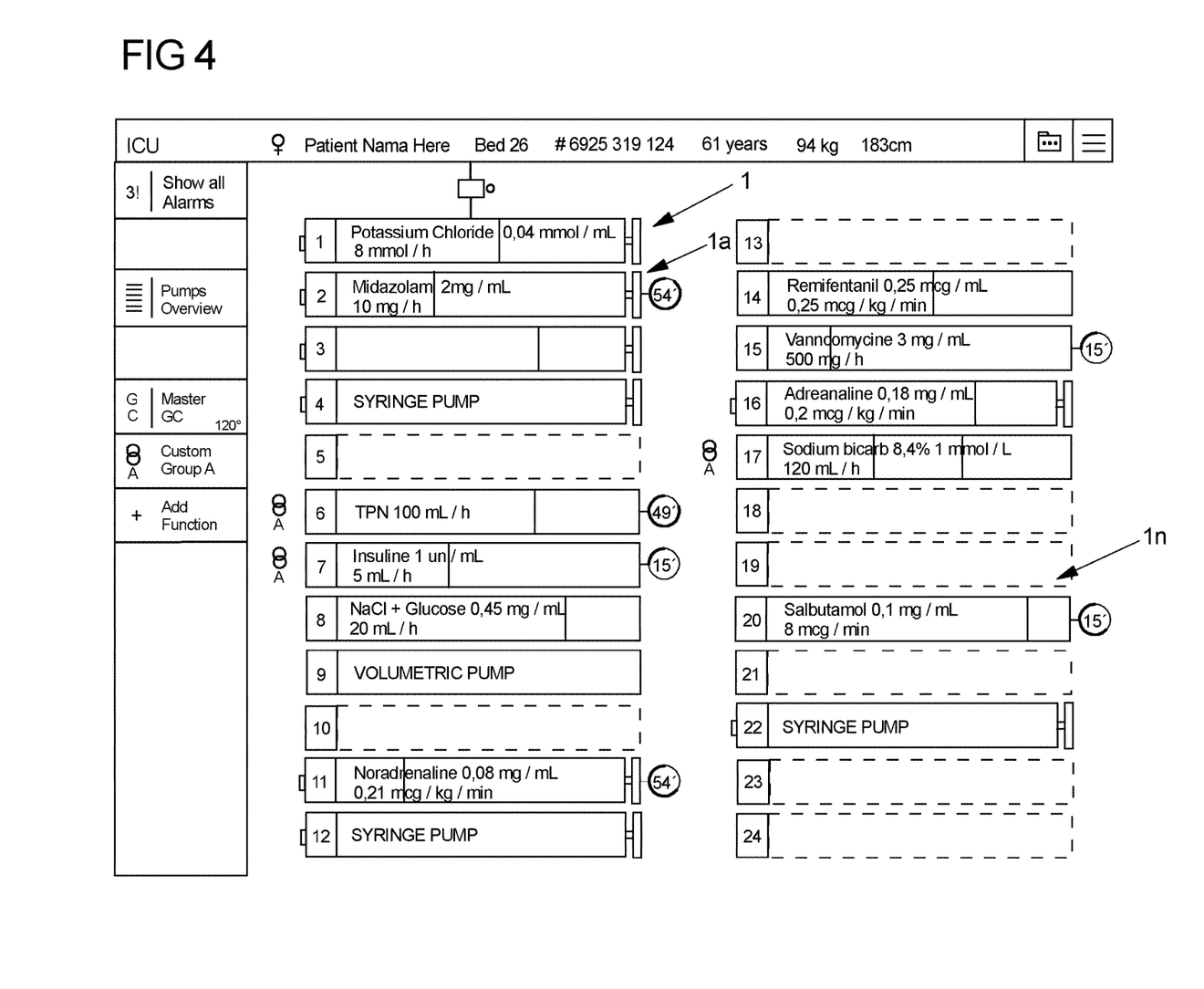
FIG. 4 shows the display of a plurality of progress bars according to an embodiment of the invention.

FIG. 4 shows the display of a plurality of progress bars 1, 1a-1n according to an embodiment of the invention.

In FIG. 4 it is shown that a plurality of fluids are dispensed with a plurality of medical pump devices. The corresponding progress bars 1, 1a-1n are displayed in the display as shown. The different colors can be indicative of different fluids which are dispensed and/or to an alarm event. Here, the various hatching patterns stand for either a similar or a different color/shading.

Figure 5:
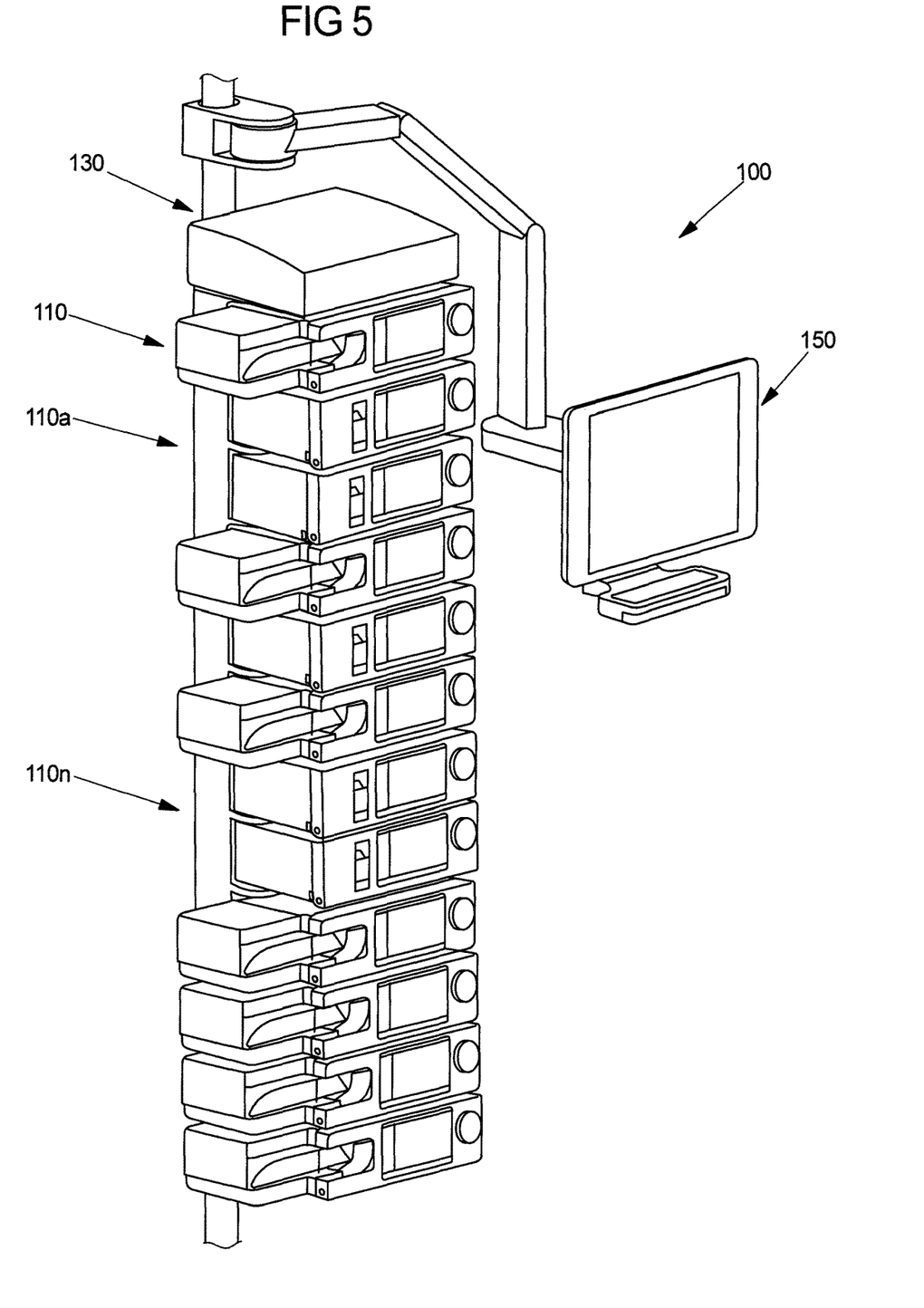
FIG. 5 shows a medical system with a plurality of medical devices.

FIG. 5 shows a medical system 100 comprising a plurality of medical pump devices 110, 110a-110n. The medical pump devices 110, 110a-110n are mounted on a rack 130 which itself, e.g., may have a stand or be fixed to a wall or the like. In the present case, each of the medical pump devices 110, 110a-110n is an infusion pump. According to FIG. 5, the medical system 100 comprises two different types of infusion pumps, namely medical pump devices 110 in the form of syringe pumps and medical pump devices 110a in the form of volumetric pumps. The medical system 100 may be used, e.g., in a hospital. According to further embodiments, a wider variety of medical pump devices could be used, e.g. comprising feeding pumps, etc.

The medical pump devices 110, 110a-110n are connected to an apparatus 150 for displaying progress information, which can be comprised in the therapy manager, as described above.

The display of the plurality of progress bars 1, 1a-1n shown in FIG. 4 can each correspond to one of the plurality of medical pump devices 110, 110a-110n as shown in FIG. 5.

Figure 6:
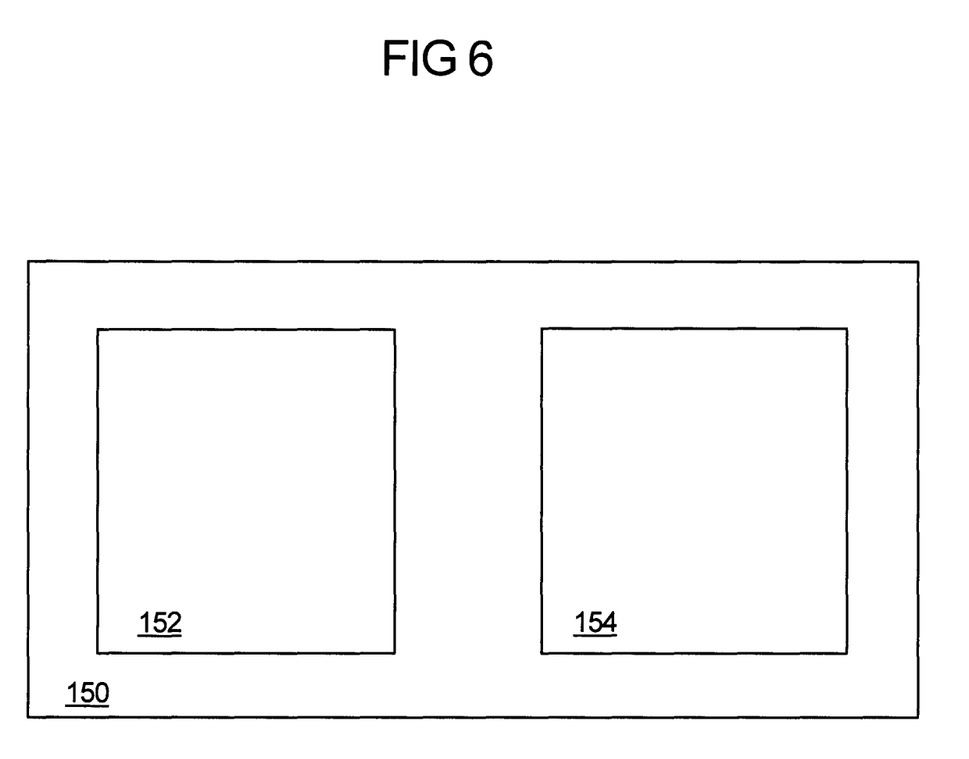
FIG. 6 shows a schematic view of an apparatus for displaying progress information according to an embodiment of the invention.

FIG. 6 shows a schematic view of an apparatus 150 for displaying progress information. The apparatus comprising a processing device 152, adapted to receive data associated with the total amount of the fluid to be dispensed, and to receive consecutively status information pertaining at least to the amount of the fluid already dispensed; and a display device 154, adapted to display the progress bar.

LIST OF REFERENCE NUMERALS 1, 1a-1n Progress Bar
3 First Section
5 Second Section
6 Beam
7 Sub-Section
9 First Textual Indication
11 Second Textual Indication
100 Medical System
110, 110a-110n Medical Pump Device
130 Rack
150 Apparatus for Displaying
152 Processing Device
154 Display Device

The invention claimed is:

1. A method for displaying progress information on dispensing at least one fluid with at least one medical pump device, comprising:
receiving, at a processing device, data associated with a total amount of the fluid to be dispensed; receiving consecutively, at the processing device, status information pertaining at least to an amount of the fluid already dispensed; displaying, on a display device, a progress bar, comprising: a first section having a first size corresponding to an amount of the fluid yet to be dispensed, and a second section having a second size corresponding to the amount of the fluid already dispensed; and determining based on the received status information whether fluid is being dispensed, and highlighting at least a part of the progress bar based on determining that fluid is being dispensed.

2. The method of claim 1, wherein the highlighting is provided by a different dynamic optical appearance of at least part of the progress bar.

3. The method of claim 2, wherein the different dynamic optical appearance is provided by at least one element of the group consisting of re-coloring, flashing, putting a frame at least partially around the progress bar and changed luminosity.

4. The method of claim 1, wherein the highlighting at least a part of the progress bar comprises highlighting the first section and/or the second section.

5. The method of claim 1, wherein the highlighting at least a part of the progress bar based on determining that fluid is being dispensed comprises:
superimposing at least a part of the progress bar with a dynamic wave effect extending at least partly from a perimeter of the progress bar by generating at least one sub-section having a different dynamic optical appearance, for instance shade or color, in particular a brighter shade or color, than the first section and/or second section, and propagating the sub-section through the progress bar at least partly.

6. The method of claim 5, wherein the highlighting at least a part of the progress bar comprises:
superimposing the first section at least partly with the dynamic wave effect extending at least partly from one of the
left or right perimeter of the first section, or
top or bottom perimeter of the first section
by generating the at least one sub-section having the different dynamic optical appearance than the first section, and propagating the at least one sub-section at least partly through the first section with a predetermined propagation speed.

7. The method of claim 5, wherein propagating the at least one sub-section comprises: adding a fading gradient to the at least one sub-section orientated in an opposite direction of a propagation direction.

8. The method of claim 1, wherein displaying the progress bar comprises: projecting a beam originating from a sub-section of a highlighted part of the progress bar into a non-highlighted part of the progress bar.

9. The method of claim 1, wherein displaying the progress bar comprises:
displaying, in a horizontal or vertical direction, the first section and the second section consecutively, and/or
displaying the first section with the first size decreasing by an equal amount as the second size of the second section is increasing, while the amount of the fluid already been dispensed is increasing, and/or
displaying the progress bar spanning at least 85% of a useable display width or height of the display device, and/or
displaying, at the first section a first textual indication pertaining to the amount of the fluid yet to be dispensed, and/or
displaying, at the second section a second textual indication pertaining to the amount of the fluid already dispensed, and/or
displaying the first section in a different shade than the second section.

10. The method of claim 1, wherein the first section is arranged on a perimeter of the progress bar in accordance with a dispensing direction of the medical pump.

11. The method of claim 1, wherein the method comprising: determining, based on the status information, an alarm event, and highlighting the first section and/or the second section using a color scheme corresponding to the alarm event.

12. The method of claim 1, wherein receiving consecutively, at the processing device, the status information pertaining at least to the amount of the fluid already dispensed comprises:
receiving the status information in real-time, and/or receiving textual data and displaying the textual data in the progress bar.

13. The method of claim 1, further comprising:
dispensing at least a further fluid with a further medical pump device; and
displaying, on the display device, at least one further progress bar associated with the at least a further fluid, the at least one further progress bar comprising a first section having a first size corresponding to an amount of the at least a further fluid yet to be dispensed, and a second section having a second size corresponding to the amount of the at least a further fluid already dispensed.

14. The method of claim 13, further comprising: displaying the first section and/or the second section of the progress bar and the first section and/or the second section of the at least one further progress bar using a specific color and/or contour shape associated with the medical pump device and the further medical pump device.

15. A computer-readable storage medium comprising instructions which, when executed by a computer, cause the computer to carry out the steps of the method of claim 1.

16. An apparatus for displaying progress information on dispensing at least one fluid with at least one medical pump device, comprising:
a processing device, adapted to receive data associated with a total amount of the fluid to be dispensed, to receive consecutively status information pertaining at least to an amount of the fluid already dispensed, and to determine based on the received status information whether fluid is being dispensed; and
a display device, adapted to display a progress bar, comprising:
a first section having a first size corresponding to an amount of the fluid yet to be dispensed, and
a second section having a second size corresponding to the amount of the fluid already dispensed, and
wherein at least a part of the progress bar is highlighted based on determining that fluid is being dispensed.

17. The apparatus of claim 16, wherein the medical pump device is a nutrition pump or an infusion pump.

* * * * *